Jan. 2, 1968   J. KEARNS   3,361,499

BALL BEARING ASSEMBLIES

Filed Feb. 12, 1965

JOSEPH KEARNS
INVENTOR
Harry Ernest Rubens
ATTORNEY

United States Patent Office 3,361,499
Patented Jan. 2, 1968

3,361,499
BALL BEARING ASSEMBLIES
Joseph Kearns, Reservoir Place, Alumwall Industrial
Estate, Walsall, England
Filed Feb. 12, 1965, Ser. No. 432,237
Claims priority, application Great Britain, July 17, 1964,
29,322/64; Nov. 4, 1964, 44,885/64
2 Claims. (Cl. 308—201)

ABSTRACT OF THE DISCLOSURE

A cage for a ball bearing assembly comprising two parts made of sintered powdered metal each having ball bearing recesses on the inner face, and stepped portions on the outer face equally spaced so as to provide a constant axially extending thickness to avoid concentrations of stress at particular points circumferentially around the cage.

---

This invention relates to ball bearing assemblies.

A conventional ball bearing assembly comprises inner and outer race rings, and a plurality of ball bearings disposed in an annular row between the race rings and spaced apart from one another by a cage. The cage is often made as a pressing from sheet steel.

For certain heavy duty uses of the conventional ball bearing assembly, for example when carrying heavy loads and/or operating under extreme conditions, said assembly is not entirely satisfactory. In conveyor systems, for example, which utilise large numbers of ball bearing assemblies which carry workpieces through heat treatment furnaces or in acid-laden atmospheres, the assemblies have a very short useful life, and it is found that the parts which fail first are the cages.

It is an object of the invention to provide an improved cage for a ball bearing assembly.

In accordance with the invention a cage for a ball bearing assembly comprises two ring-like parts for meeting in a plane normal to the axis of the cage, each part being composed of compacted and sintered powdered metal.

Preferably the ring-like parts are identical, and each has an approximately constant axially extending thickness (when measured circumferentially) around the part.

A typical example of the invention, and a modification thereof, are more particularly described below with reference to the accompanying drawings, in which.

Figure 1:
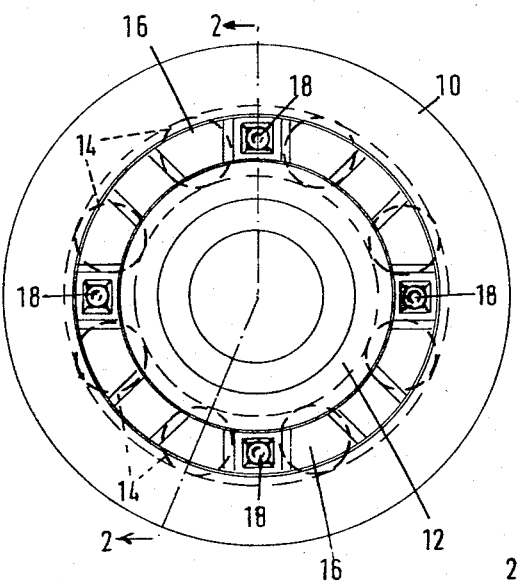
FIGURE 1 is a side elevation of a ball bearing assembly.
Figure 2:
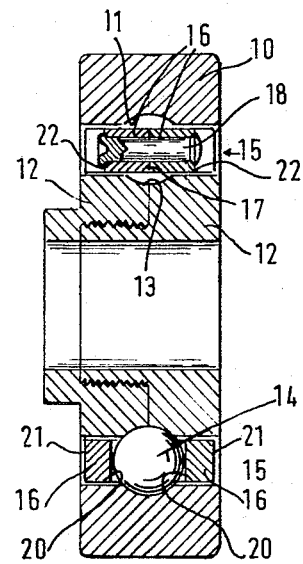
FIGURE 2 is a sectional view taken along the line 2—2 on FIGURE 1.
Figure 3:
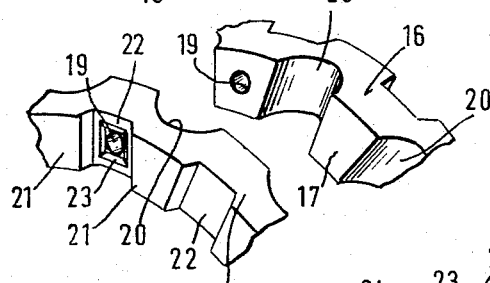
FIGURE 3 is a perspective view of part of the cage of FIGURE 1 prior to assembly.
Figure 4:
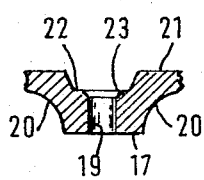
Figure 6:
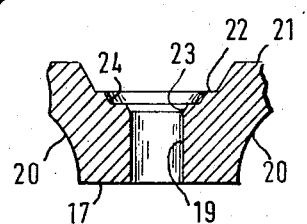
Figure 5:
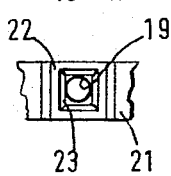
Figure 7:
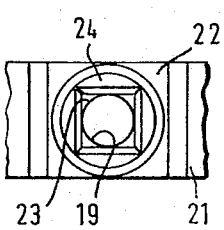

FIGURES 4 and 5 are respectively scrap sectional and plan views of the cage; and FIGURES 6 and 7 correspond to FIGURES 4 and 5 and show scrap views of a modified cage.

Referring initially to FIGURES 1 to 5, a ball bearing assembly comprises an outer ring 10 with a race 11 formed on its radially inner surface, a composite inner ring 12 with a race 13 formed on its radially outer surface, a plurality of ball bearings 14 (eight in this example), and a cage 15. The cage 15 acts to keep equidistant spacing of the ball bearings 14 around and between the races 11 and 13, and to exclude a large proportion of dust and dirt from the ball bearings and races whilst assisting in retaining lubricant.

The cage 15 comprises two identical ring-like parts 16 which are assembled together with their axially inner faces 17 meeting in a plane normal to the axis of the cage 15 and the assembly, and bisecting the ball bearings 14. The parts 16 are held together by four rivets 18 (or pins or the like), which are preferably of steel for high temperature work, and which pass through registering apertures 19 in the parts 16.

The axially inner face 17 of each ring-like part 16 is formed with eight semi-cylindrical recesses 20 equally spaced around the ring with radially extending axes. Each recess 20 co-operates with a corresponding one of the recesses 20 of the other part 16 to constitute a cylindrical cage for a corresponding one of the ball bearings 14. The axially outer face 21 of each part 16 is formed with eight stepped-in portions 22 between the recesses 20 in the inner face 17. It is through four equally spaced ones of the portions 22 that the apertures 19 are formed.

Referring particularly to FIGURES 4 and 5, each aperture 19 is formed through the base of a hollow 23 of frusto-pyramidal form so that the head or tip of the shank at each rivet 18 may extend into the hollow 23, this giving an improved fastening which reduces the possibility of fracture of the parts 16 during riveting and in use. Moreover, it allows a tolerance in the necessary length of the rivet 18. In the present example the hollow 23 is of square base.

Referring now to FIGURES 6 and 7, a modification of the cage 15 is shown in which the hollow 23 for each aperture 19 opens from the base of a frusto-conical well 24 formed in the corresponding stepped portion 22. The use of the well 24 increases the acceptable tolerance in rivet length, and reduces the axial thickness of the cage part at that point.

The cage parts 16 are composed of compacted and sintered powdered metal of which the manufacturing procedure can follow conventional powder metallurgy techniques. Thus, in the present example, a powder mixture is produced as follows:

| | Percent |
|---|---|
| Nickel | 1.2 to 1.8 |
| Copper | 0.8 to 1.2 |
| Manganese | 2.2 to 2.6 |
| Carbon | 0.6 to 0.9 |
| Iron | Remainder |
| Total | 100 |

The mixture is compacted in dies at a minimum pressure of 22 tons per square inch to produce a minimum green density of 6.3 grams/cubic centimetre. Sintering then follows at approximately 1150° C. for about one hour.

It will be appreciated that the die cage parts 16 can be produced in this way in a form which needs no machining and no further manufacturing steps.

The ball bearing assembly described above has been found to be highly satisfactory in use as compared with assemblies having pressed steel cages. This is primarily due to the reduced cage failure rate. The cages have excellent wear resistant properties under arduous heavy duty conditions, for example in conveyor systems where the assemblies support loads and transport them, for example, through degreasing baths, heat treatment furnaces and the like. This is in part due to the increased thickness of material in the cages, this being made possible by utilising a compacted metal without substantially increasing the total weight of the cage, and in part due to the permeability of the cage material enabling minor but crucial amounts of lubricant to be trapped in the cage material as well as between the cage parts, thus not only reducing wear on the ball or roller bearings, but also preventing corrosive attack on the cage material.

Previous experimental attempts by the present inventor to produce a powdered metal cage part have met with less satisfactory results when compared with the cage part described above. The exceptional success of the cage part described is thought to be due to the provision of the stepped-in portions, these having the effect of giving the cage part an approximately constant axially-extending thickness around the part, and so avoiding concentrations of stress at particular points around the part. This is in contrast to a cage part with no stepped-in portions where failure was liable to occur at stress concentration points opposite the ball-receiving recesses. The hollows 23 and wells 24 effect increased constancy in the axially extending thickness of the cage parts.

What I claim is:

1. A cage for a ball bearing assembly, comprising two identical ring-like parts for meeting in a plane normal to the axis of the cage, each part being composed of compacted and sintered powdered metal, having an approximately constant axially-extending thickness around the part, having an axially inner face into which are formed a plurality of recesses equally spaced around the part and extending over the whole radial width of the part to receive ball bearings, and having an axially outer face into which are formed inwardly stepped portions also extending over the whole radial width of the part and between said recesses to maintain said approximately constant axially-extending thickness to prevent concentrations of stress at particular points circumferentially around said part.

2. A cage for a ball bearing assembly as claimed in claim 1, wherein instead stepped portions are frusto-pyramidal in shape.

References Cited

UNITED STATES PATENTS

| | | |
|---|---|---|
| 1,656,508 | 1/1928 | Claus. |
| 2,038,010 | 4/1936 | Smith. |

FOREIGN PATENTS

| | | |
|---|---|---|
| 279,369 | 10/1927 | Great Britain. |
| 283,542 | 5/1928 | Great Britain. |

OTHER REFERENCES

Design of Powdered Metal Parts by W. H. Arata, published in Produce Engineering, August 1944, pages 561–564 relied upon.

MARTIN P. SCHWADRON, *Primary Examiner.*

FRANK SUSKO, *Examiner.*